(12) United States Patent
Dhingra

(10) Patent No.: US 11,836,582 B2
(45) Date of Patent: Dec. 5, 2023

(54) SYSTEM AND METHOD OF MACHINE LEARNING BASED DEVIATION PREDICTION AND INTERCONNECTED-METRICS DERIVATION FOR ACTION RECOMMENDATIONS

(71) Applicant: SAMYA.AI INC., Northbrook, IL (US)

(72) Inventor: Deepinder Singh Dhingra, Bangalore (IN)

(73) Assignee: Asper.AI Inc., Northbrook, IL (US)

( * ) Notice: Subject to any disclaimer, the term of this patent is extended or adjusted under 35 U.S.C. 154(b) by 840 days.

(21) Appl. No.: 16/905,797

(22) Filed: Jun. 18, 2020

(65) Prior Publication Data

US 2021/0201176 A1     Jul. 1, 2021

(30) Foreign Application Priority Data

Dec. 28, 2019   (IN) .............................. 201941054319

(51) Int. Cl.
  *G06Q 30/00*     (2023.01)
  *G06N 20/00*     (2019.01)
(52) U.S. Cl.
  CPC .................... *G06N 20/00* (2019.01)
(58) Field of Classification Search
  CPC .................................................... G06N 20/00
  See application file for complete search history.

(56) References Cited

U.S. PATENT DOCUMENTS

| | | | | |
|---|---|---|---|---|
| 11,553,870 | B2* | 1/2023 | Le | .......................... A61B 5/316 |
| 11,615,293 | B2* | 3/2023 | Theocharous | ........... G06N 3/08 |
| | | | | 706/17 |
| 2018/0165604 | A1* | 6/2018 | Minkin | ................... G06Q 10/06 |
| 2019/0102835 | A1  | 4/2019 | Bjonerud et al. | |
| 2021/0049460 | A1* | 2/2021 | Ahn | ........................ G06N 3/045 |
| 2021/0142253 | A1* | 5/2021 | Cohen | ................ G06Q 30/0202 |

FOREIGN PATENT DOCUMENTS

CN          107229729 A       10/2017

OTHER PUBLICATIONS

Ibe_Elsevier_2013_Chapter_13-14.*
Jeong_2014_Elsevier_pp_67-77.*
Shishvan_2018_IEEE_pp_46419-46494.*
NIST Definition of Cloud Computing, Mell, NIST, Department of Commerce, 2011, pp. 1-3.*

* cited by examiner

*Primary Examiner* — Michael I Ezewoko
(74) *Attorney, Agent, or Firm* — Wiley Rein

(57) ABSTRACT

A system and method for automatically predicting deviation on a metric of a use-case and deriving interconnections between metrics for generating action recommendations is provided. The system includes a deviation management system 104 which captures data from a plurality of external sources and internal sources and comprises of a deviation management platform 106 and a deviation management environment 108. The system includes various computation modules which work the deviation management platform 106 to provide a deviation management service to a set of clients that are associated with that service. The service and its users are specific to use-case, wherein the use-case is specified by a client device 116 inside the system. The system comprises of external data which is horizontal across a plurality of deviation management services and internal data which is specific to every deviation management service.

9 Claims, 7 Drawing Sheets

SYSTEM AND METHOD OF MACHINE LEARNING BASED DEVIATION PREDICTION AND INTERCONNECTED-METRICS DERIVATION FOR ACTION RECOMMENDATIONS

BACKGROUND

Technical Field

The embodiments herein generally relate to automating prediction of deviation on a metric, and more particularly, using Artificial Intelligence (AI) models and interconnecting the Artificial Intelligence (AI) models in order to facilitate automated prediction of deviation on the metric as well as analysis of the prediction.

Description of the Related Art

Achieving a target requires careful planning and execution. There remain certain metrics for each use-case which are used to determine the performance of execution. Traditionally, the forecasts that are done for the use-case are done on a rolling basis, such as monthly or weekly rolling forecasting for an oncoming period of the next three or six months. Also, traditional approaches for deviation detection have relied on traditional statistics and rules-based methods (simple algebraic methods). Also, the traditional systems such as Enterprise Resource Planning (ERP) and planning systems are not architected to handle high volume and speed and complex relationship scenarios. Due to prevalent high amount of complexity and dynamicity, these forecasts face a lot of deviation especially for future time periods and there is almost always a deviation from what is expected to be normal and the actual. The deviation is anticipated but is not accurately predicted beforehand in time.

Further, for a use-case, there are many changes that keep occurring that are both external and internal to the use-case. Even if a prediction of deviation is made, the prediction is static and deterministic (fixed, point number). In real-time, the factors affecting the deviation are dynamic in nature and this results in decaying of the prediction and its accuracy, or, a new prediction is required along with probability distribution of the deviation. This results in poor decision making.

Further, determination of the reason of deviation is also important. For this, high human expertise & skill is required and the determination is not accurate. The direct interconnections may be derived but even an expert is bound to miss on the indirect and cascading reasons that affect the deviation. Further, as the number of factors, combinations of units such as products, channels, geographies have increased, these approaches have limitations on both the scale and ability to handle the data and factors which are usually amount to thousands of factors and terabytes of data. It is not possible for a human being to carry out these methods.

Accordingly, there remains a need of a system and method which can automatically predict the deviations beforehand and in time, derive interconnections between metrics and give action recommendations to mitigate or leverage the deviation for careful decision making.

SUMMARY

In the view of the foregoing, an embodiment herein provides a processor implemented method of machine learning based deviation prediction and interconnected-metrics derivation for action recommendations. The method includes the steps of (i) specifying, using a client device (116), a meta data model of a use-case and at least one metric of interest, (ii) obtaining a specification information of a deviation management service from a client device (116) and computing a one or more deviations of at least one metric of interest, (iii) identifying at least one trend and a one or more factors which relate to the one or more deviations of the at least one metric of interest, (iv) deriving a one or more interconnections among the one or more deviations of the at least one metric of interest using interconnected machine learning models, (v) determining at least one predicted deviation based on the one or more deviations and a probability distribution associated with the at least one predicted deviation based on a one or more interconnected prediction models (vi) classifying the at least one predicted deviation if the at least one predicted deviation qualifies above a predefined threshold and assigning a score to the at least one predicted deviation on the basis of a criticality, (vii) determining a one or more factors which attribute to the at least one predicted deviation based on data available in an external information database (112) and a repository (210) (viii) determining a quantified impact of the at least one predicted deviation using interconnected machine learning models, (ix) generating an action recommendation for the use-case based on the probability distribution of the at least one predicted deviation, the probability distribution of an outcome of at least one action alternative and the quantified impact, wherein the action recommendation is at least one of mitigation or leverage for the use-case, (x) tracking an action taken in the use-case from the client device (116) to enable reinforcement learning, and (xi) providing accurate predictions on the one or more deviations of the at least one metric of interest based on the reinforcement learning.

In an embodiment, the method includes a use-case configer module that receives the meta data model of the use-case from the client device and model the existing deviation management services to determine the specification information of the deviation management service.

In an embodiment, the deviation management environment progressively learns from the latest available data and updates the one or more interconnected prediction models of the derivation prediction module.

In an embodiment, the recommendation module prioritizes a one or more action recommendations to optimize at least one metric of performance of the use-case based on the quantified impact of the at least one deviation.

In an embodiment, the external information database includes weather data, industry data, competitor data, macro-economic data that enable the determination of external factors that attribute to the deviation in the at least on metric of interest.

In an embodiment, the client device is used to specify at least one rule or operational constraint associated with the use-case to enable the deviation management environment to generate action recommendation based on the specified rule or operational constraint.

In an embodiment, the deviation management environment determines an expected outcome of the action recommendation for the use-case, wherein the expected outcome includes (i) quantified gain outcome based on the at least one metric of interest if the use-case takes the action recommendation and (ii) quantified loss outcome based on the at least one metric of interest if the use-case does not take the action recommendation.

In an embodiment, the one or more interconnections that are derived among the one or more deviations of the at least one metric of interest comprises at least one of direct, indirect or cascading relationship.

In another aspect, a system of machine learning based deviation prediction and interconnected-metrics derivation for action recommendations is provided. The system includes (i) a client device that is used to specify a meta data model of a use-case, select at least one metric of interest and capture a use-case action (ii) a deviation management environment that provides a deviation management service of the use-case to the client device, wherein the deviation management environment further includes (a) a deviation computation module that obtains a specification information of a deviation management service from a client device and computing a one or more deviations of at least one metric of interest, (b) a deviation factor discovery module that identifies at least one trend and a one or more factors which relate to the one or more deviation of the at least one metric of interest, (c) a deviation interconnections derivation module that derives a one or more interconnections among the one or more deviations of the at least one metric of interest using interconnected machine learning models, (d) a deviation prediction module comprising a one or more interconnected prediction models, wherein the deviation prediction module determines at least one predicted deviation based on the one or more deviations and a probability distribution associated with the at least one predicted deviation, (e) a predicted deviation classifier and scoring module that receives the at least one predicted deviation determined by the deviation prediction module (308), determines if the at least one predicted deviation qualifies above a predefined threshold, classifies the at least one predicted deviation and assigns a score to the at least one predicted deviation on the basis of a criticality, (f) a predicted deviation attribution module that utilizes data available in an external information database and a repository to determine a one or more factors which attribute to the at least one predicted deviation, (g) a predicted deviation impact computation module that determines a quantified impact of the at least one predicted deviation using interconnected machine learning models, (h) a recommendation module that generates action recommendation for the use-case based on the probability distribution of the at least one predicted deviation, a probability distribution of an outcome of at least one action alternatives and the quantified impact, wherein the action recommendation is of either mitigation or leverage for the use-case, (i) an action tracking module that tracks an action taken in the use-case from the client device to enable reinforcement learning for providing accurate predictions on the one or more deviations of the at least one metric of interest.

In an embodiment, a one or more non-transitory computer-readable storage mediums storing the one or more sequences of instructions, which when executed by the one or more processors, causes to perform method of machine learning based deviation prediction and interconnected-metrics derivation for action recommendations. The method includes the steps of (i) specifying, using a client device, a meta data model of a use-case and at least one metric of interest, (ii) obtaining a specification information of a deviation management service from a client device and computing a one or more deviations of at least one metric of interest, (iii) identifying at least one trend and a one or more factors which relate to the one or more deviations of the at least one metric of interest, (iv) deriving a one or more interconnections among the one or more deviations of the at least one metric of interest using interconnected machine learning models, (v) determining at least one predicted deviation based on the one or more deviations and a probability distribution associated with the at least one predicted deviation based on a one or more interconnected prediction models (vi) classifying the at least one predicted deviation if the at least one predicted deviation qualifies above a predefined threshold and assigning a score to the at least one predicted deviation on the basis of a criticality, (vii) determining a one or more factors which attribute to the at least one predicted deviation based on data available in an external information database and a repository (viii) determining a quantified impact of the at least one predicted deviation using interconnected machine learning models, (ix) generating an action recommendation for the use-case based on the probability distribution of the at least one predicted deviation, the probability distribution of an outcome of at least one action alternative and the quantified impact, wherein the action recommendation is at least one of mitigation or leverage for the use-case, (x) tracking an action taken in the use-case from the client device to enable reinforcement learning, and (xi) providing accurate predictions on the one or more deviations of the at least one metric of interest based on the reinforcement learning.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
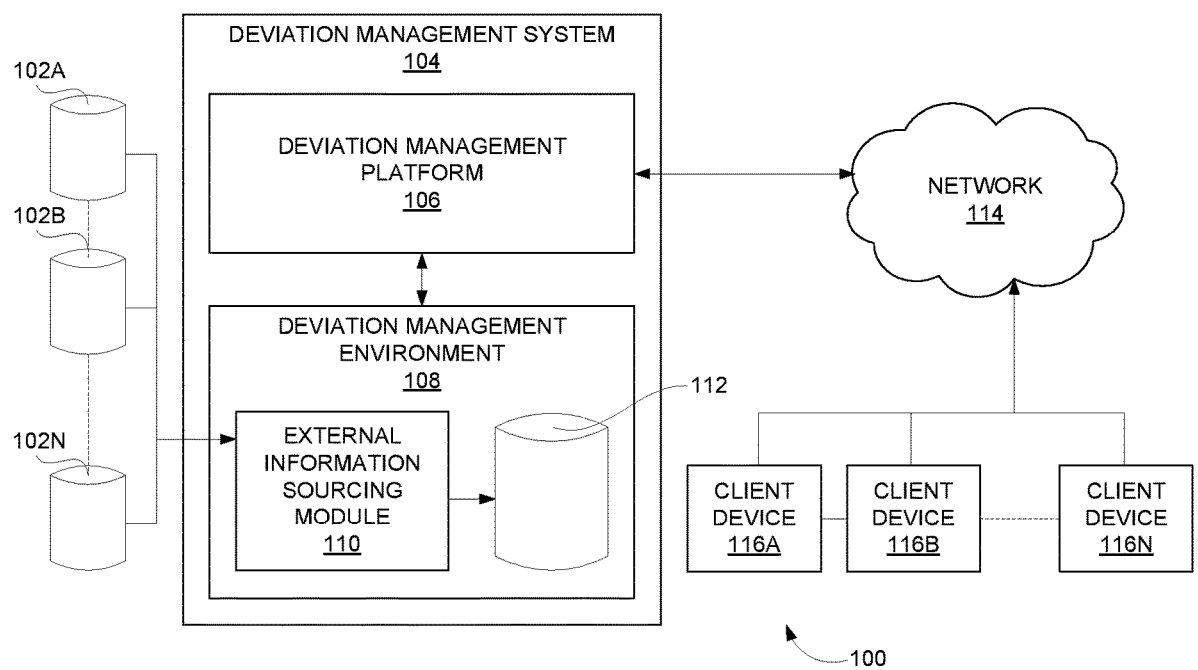
FIG. 1 is a block diagram that illustrates a cloud computing architecture that facilitates a deviation management system as a cloud computing service to one or more client devices according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the view of the foregoing, the need of a system and method which can automatically predict the deviations, derive interconnections between metrics and give action recommendations is fulfilled in the ongoing description by: (a) predicting deviation of the one or more metrics, (b) quantifying the probability distribution of the deviation (b) attributing factors and their relative impact (importance, contribution) for the predicted deviation, (c) deriving impact of predicted deviation and (d) deriving interconnections between the metrics. The combination of the above methods is being referred to "deviation management". Referring now to the drawings, and more particularly to FIGS. 1 through 7, where similar reference characters denote corresponding features in a consistent manner throughout the figures, there are shown preferred embodiments.

FIG. 1 is a block diagram 100 that illustrates a cloud computing architecture that facilitates a deviation management system as a cloud computing service to one or more client devices. The block diagram 100 includes a one or more data sources 102A-N, a deviation management system 104, a network 114 and a one or more client devices 116A-N. The deviation management system 104 includes of a deviation management platform 106 and a deviation management environment 108. The deviation management environment 108 includes an external information sourcing module 110 and an external information database 112 The cloud computing service includes deviation management resources residing within a deviation management environment 108 and the deviation management resources are managed by the deviation management platform 106 to provide deviation management as a cloud computing service (hereafter referred to as a deviation management service) to the one or more client devices 116A-N. In some embodiments, the set of client devices 116A-N and the deviation management service are associated with a use-case, a metadata model of which is specified by a client device 116.

In some embodiments, the deviation management system 104 is configured to receive data from one or more data sources 102A-N which is processed by the external information sourcing module 110 and stored in the external information database 112. The external information database 112 includes information which remains horizontal for a one or more deviation management services. The deviation management platform 106 is communicatively connected to the deviation management environment 108 to provide the deviation management service to the one or more client devices 116A-N through a network 114. In some embodiments, the network 104 is a wired network, a wireless network, or a combination of a wired network a wireless network. In some embodiments, the network 104 is the Internet.

In some embodiments, the external information database 112 includes data obtained from one or more external sources that includes weather data, e.g. temperature, humidity, etc., competition data, industry data, one or more consumer indices or macro-economic indices such as Gross Domestic Product (GDP), an inflation metric or employment rate, etc. In some embodiments, the external information database 112 may include demographics data that includes income data of residents, population, etc.

In an embodiment, the deviation management system may include a plurality of weather sensors that provide weather information for computing deviation of the metric of interest.

Figure 2:
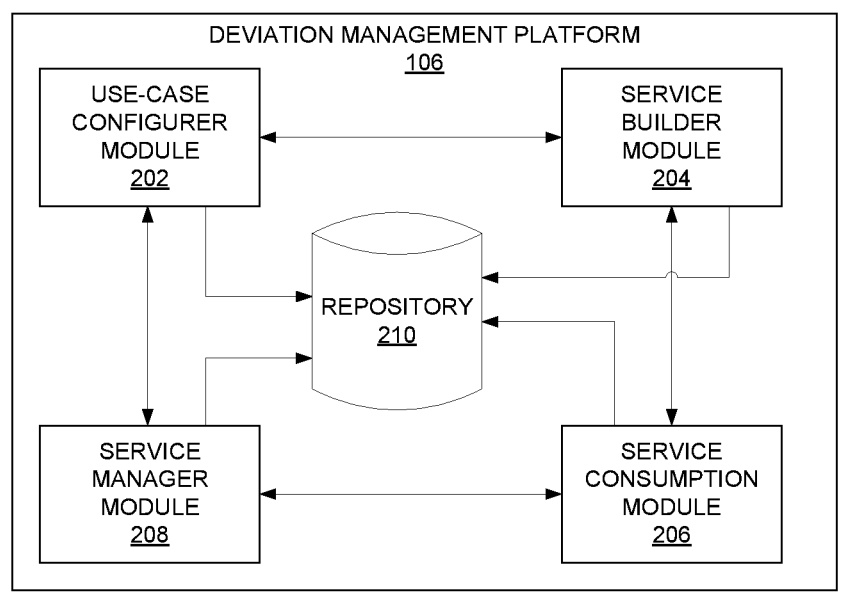
FIG. 2 is a block diagram of the deviation management platform of FIG. 1 according to some embodiments herein.

FIG. 2 is a block diagram 200 of the deviation management platform 106 of FIG. 1 according to some embodiments herein. The deviation management platform 106 includes a use-case configurer module 202, a builder module 204, a service consumption module 206, a service manager module 208 and a repository 210. In some embodiments, the service consumption module 206 is connected to the network 114 in order to facilitate the usage of a deviation management service to the one or more client devices 116A-N.

The use-case configurer module 202 captures a specification information of a use-case for which the deviation management service is created. In some embodiments, the specification information includes internal data of the use-case and the meta-data model of metrics which are applicable for the use-case. In some embodiments, the use-case configurer module 202 enables the client device 116 to select metrics of interest and models existing deviation management services to determine the infrastructure of the deviation management environment 108 which may be required or preferred. The use-case configure module 202 captures a one or more possible actions from the client device 116 and operational constraints of the use-case.

The builder module 204 is configured to receive the specification information of the use-case from the use-case configure module 202. The builder module 204 may assemble, validate and publish the deviation management service to the service consumption module 206 for consumption of the deviation management service by the one or more client devices 116A-N associated with the service.

The service consumption module 206 is configured to allow the one or more client devices 116A-N to use the deviation management service. In some embodiments, the service consumption module 206 may allow a user to request an update in the specification information of the use-case. The service manager module 208 manages the deviation management service by communicating with the deviation management environment 108.

Figure 3:
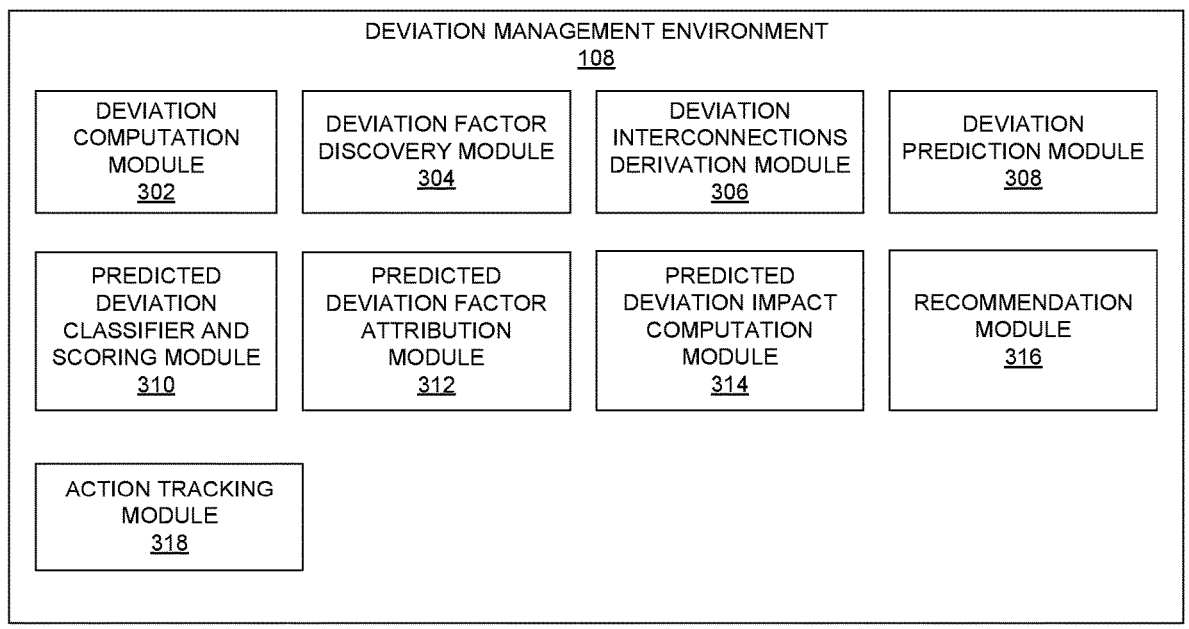
FIG. 3 is a block diagram of the deviation management environment of FIG. 1 according to some embodiments herein.

FIG. 3 is a block diagram 300 of the deviation management environment 108 of FIG. 1 according to some embodiments herein. The block diagram 300 is an exploded view of the deviation management environment 108. The deviation management environment 108 includes a deviation computation module 302, a deviation factor discovery module 304, a deviation interconnections derivation module 306, a deviation prediction module 308, a predicted deviation classifier and scoring module 310, a predicted deviation factor attribution module 312, a predicted deviation impact computation module 314 and a recommendation module 316.

The deviation computation module 302 receives the specification information of the deviation management service from the repository 210 of the deviation management platform 106 and computes a deviation of metrics. The deviation factor discovery module 304 discovers trends and a one or more factors which are related to the deviations in the metric. In some embodiments, the discovered trends and the one or more factors are stored in the repository 210. The deviation interconnections derivation module 306 derives interconnections between different deviations using interconnected machine learning models. The interconnections derived between the deviations may be direct, indirect or cascading. Since the factors affecting the deviation scale to the scale of thousands, it is humanly impossible for even for a professional to train and perform the methods of the deviation management system 104. The deviation interconnections derivation module 306 may employ deep learning and neural network architectures to accurately determine interconnections between different deviations.

In an embodiment, the interconnected machine learning models may include a one or more machine learning models that are interconnected with each other. The models are connected with each other in such a manner that the output of a first machine learning model becomes a feature for a second machine learning model.

In an embodiment, the interconnected machine learning model may include advanced algorithms including but not limited to SVR, XGBoost, Random Forests, Prophet, DeepAR, LSTM/RNNs, Generative Adversarial Networks, Convolutional Neural Networks, Quantile Regressions, Bayesian Regressions, Factorization Machines, Bayesian Structural Time Series Models, Hidden Markov Models and Monte Carlo Markov Chains.

The deviation prediction module 308 includes multiple interconnected prediction models which enable a prediction to be made on the deviation and the associated probability distributions of the predicted deviations. The predicted deviation classifier and scoring module 310 uses a prediction determined by the deviation prediction module 308 and determines whether the prediction is significant or not. In some embodiments, if the prediction is determined as significant, the predicted deviation classifier and scoring module 310 classifies the prediction and assigns a score to the prediction on the basis of a criticality.

In some embodiments, a plurality of machine models is trained using large volume of data that is available in the external information database 112 and the repository 210. The data utilized from the external information database 112 may include weather data, e.g. temperature, humidity, etc. competition data, industry data, one or more consumer indices or macro-economic indices such as GDP, an inflation metric or employment rate, etc. In some embodiments, the external information database 112 may include demographics data which includes income, population, etc.

The predicted deviation factor attribution module 312 utilises the data available in the external information database 112 and the repository 210 determines a one or more factors which attribute to the predicted deviation. The impact of these predicted deviations is computed by the predicted deviation impact computation module 314 using interconnected machine learning models. The recommendation module 316 generates action recommendations for the client's use-case based on the probability distributions of the predicted deviations and the probability distribution of the outcomes of the different action alternatives. These recommendations include actions to either leverage or mitigate on the basis of predicted deviation. In an embodiment, the actions taken in the use-case are recorded in the deviation management system 104 through the client device 116 in order to form a continuous feedback loop. The feedback loop enables reinforcement learning by taking into account the actions taken. This allows the deviation management system 104 to make better predictions on the deviation of the metric.

In an embodiment, the predicted deviation factor attribution module 312 may use explainable AI to determine one or more factors which attribute to the predicted deviation. The impact of these predicted deviations is computed by the predicted deviation impact computation module 314 using interconnected machine learning models. The explainable AI utilizes feature importance and shapely values.

Figure 4:
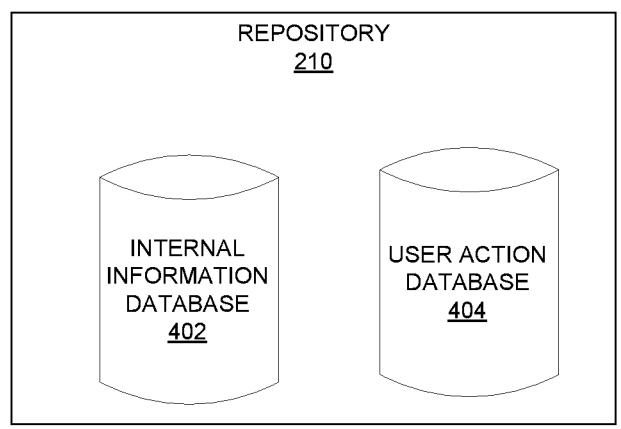
FIG. 4 is a block diagram of a repository of FIG. 2 according to some embodiments herein.

FIG. 4 is a block diagram of the repository 210 of FIG. 2 according to some embodiments herein. The repository 210 includes an internal information database 402 and a user action database 404. The internal information database 402 includes the data which is internal to the use-case that has been specified earlier. The user action database 404 stores actions which are taken by a user in the use-case. In some embodiments, the actions taken by the user in the use-case may either be based on the actions provided by the recommendation module 316 to the use-case and can also be independent from the same.

In some embodiments, the internal information database 402 may include operation data of the use-case. The operation data of the use-case may include sales operations, customer and product data, channels data, distribution and location, orders, inventory operations, production operations, POS or sales, promotions and marketing events which is specific to the use-case.

In some embodiments, the internal information database 402 includes planning data of the user case. The planning data of the use-case may include sales plans and forecasts, financial plans and forecasts, price plans, marketing plans, promotion plans, demand plans, inventory plans, production plans.

In some embodiments, the use-case configurer module 202 may capture a specification of the use-case for which the deviation management service is created. The specification may include internal data of the use-case and a meta-data model of metrics which are applicable for the use-case.

Figure 5:
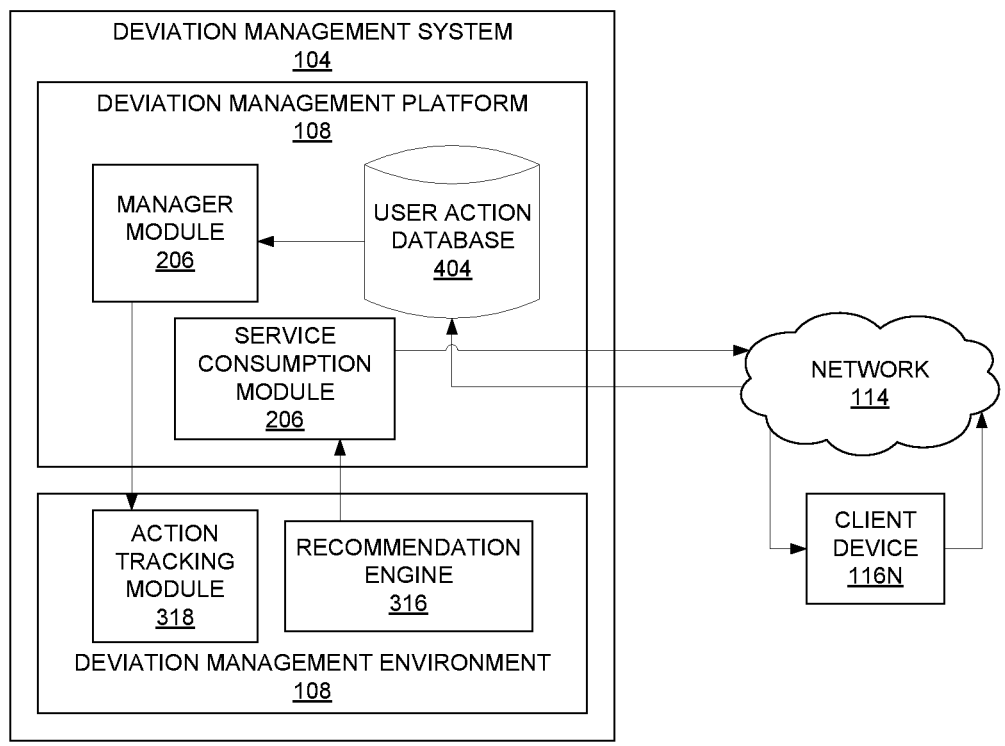
FIG. 5 is block diagram of a feedback loop which enables reinforcement learning to make better predictions on the one or more deviations of the at least one metric of interest according to some embodiments herein.

FIG. 5 is block diagram of a feedback loop which enables reinforcement learning to make better predictions on the one or more deviations of the metric of interest, according to some embodiments herein. The action tracking module 318 tracks an action taken in the use-case from the client device 116. The action may be captured from the client device 116N through the network 114. The user action database 404 stores the action taken in the use-case. In some embodiments, recorded action taken in the use-case which is stored in the user action database 404 is transmitted to the action tracking module for enabling reinforcement learning of the advanced machine learning models in the deviation management environment 108. The action tracking module may employ the advanced machine learning models for providing accurate predictions on the deviation of the metric of interest.

In some embodiments, the recommendation engine 316 transmits accurate predictions to the service consumption module 206. The service consumption module 206 communicates the accurate predictions and improved action recommendations to the client device 116N through the network 114.

Figure 6:
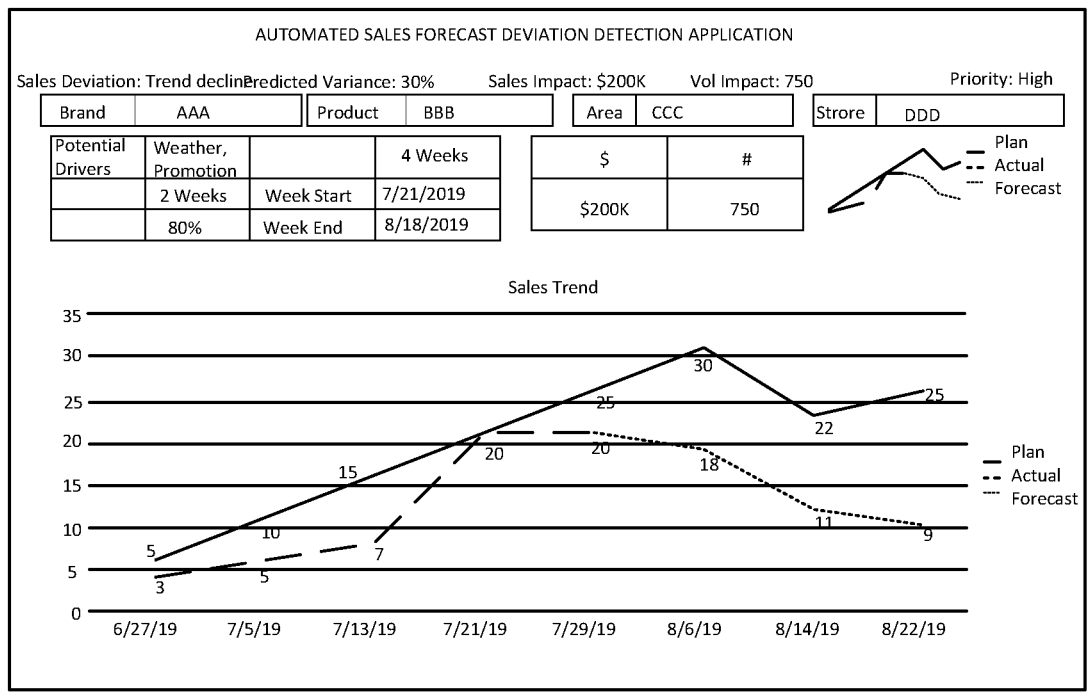
FIG. 6 is a schematic representation of the user interface of the deviation management system according to some embodiments herein.

FIG. 6 illustrates a schematic representation of the user interface of the deviation management system 104 according to some embodiments herein. In an exemplary embodiment, the graph herein illustrates the planned trend of the use-case through a solid line. The dashed line in the graph illustrates the actual of a metric on the use-case and the dotted line represents the forecast for the actuals.

In some embodiments, the illustration of FIG. 6 is transmitted and displayed on the client device 116N for a user to interpret. The user interprets this information. In an embodiment, the user takes an action in the use-case on the interpretation of this information and the action tracking module 318 tracks the action taken in the use-case from the client device 116. The action may be captured from the client device 116N through the network 114.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
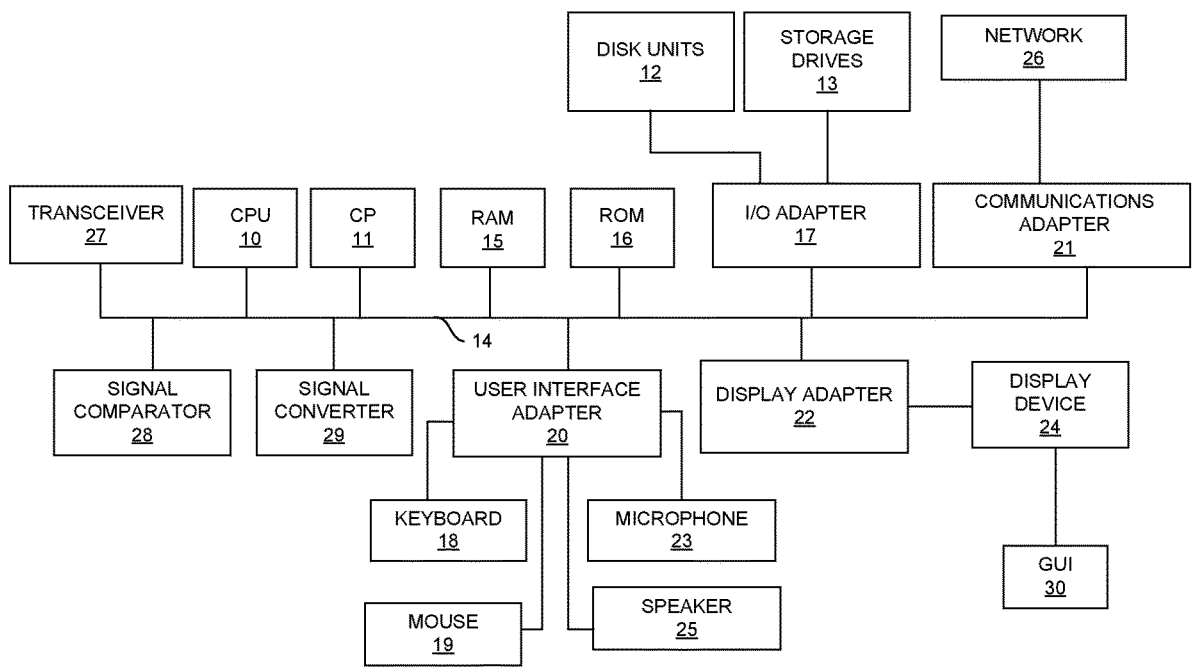
FIG. 7 is a schematic diagram of a computer architecture in accordance with the embodiments herein.

A representative hardware environment for practicing the embodiments herein is depicted in FIG. 7, with reference to FIGS. 1 through 6. This schematic drawing illustrates a hardware configuration of a server/computer system/user device in accordance with the embodiments herein. The user device includes at least one processing device 10 and a cryptographic processor 11. The special-purpose CPU 10 and the cryptographic processor (CP) 11 may be interconnected via system bus 14 to various devices such as a random access memory (RAM) 15, read-only memory (ROM) 16, and an input/output (I/O) adapter 17. The I/O adapter 17 can connect to peripheral devices, such as disk units 12 and tape drives 13, or other program storage devices that are readable by the system. The user device can read the inventive instructions on the program storage devices and follow these instructions to execute the methodology of the embodiments herein. The user device further includes a user interface adapter 20 that connects a keyboard 18, mouse 19, speaker 25, microphone 23, and/or other user interface devices such as a touch screen device (not shown) to the bus 14 to gather user input. Additionally, a communication adapter 21 connects the bus 14 to a data processing network 26, and a display adapter 22 connects the bus 14 to a display device 24, which provides a graphical user interface (GUI) 30 of the output data in accordance with the embodiments herein, or which may be embodied as an output device such as a monitor, printer, or transmitter, for example. Further, a transceiver 27, a signal comparator 28, and a signal converter 29 may be connected with the bus 14 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

I claim:

1. A method of machine learning based deviation prediction and interconnected-metrics derivation for action recommendations, the method comprising: specifying, using a client device (116), a meta data model of a use-case and at least one metric of interest; obtaining a specification information of a deviation management service from a client device (116) and computing a plurality of deviations of at least one metric of interest;
    identifying at least one trend and a set of factors which relate to the plurality of deviations of the at least one metric of interest;
    deriving a plurality of interconnections among the plurality of deviations of the at least one metric of interest using interconnected machine learning models;
    determining at least one predicted deviation based on the plurality of deviations and a probability distribution associated with the at least one predicted deviation based on a plurality of interconnected prediction models;
    classifying the at least one predicted deviation if the at least one predicted deviation qualifies above a predefined threshold and assigning a score to the at least one predicted deviation on the basis of a criticality;
    determining a set of factors which attribute to the at least one predicted deviation based on data available in an external information database (112) and a repository (210), wherein the external information database (112) comprises weather data, industry data, competitor data, and macro-economic data that enables determination of external factors that attribute to the at least one deviation in the at least one metric of interest;
    determining a quantified impact of the at least one predicted deviation using interconnected machine learning models;
    generating an action recommendation for the use-case based on the probability distribution of the at least one predicted deviation, the probability distribution of an outcome of at least one action alternative and the quantified impact, wherein the action recommendation is at least one of mitigation or leverage for the use-case;
    tracking an action taken in the use-case from the client device (116) to enable reinforcement learning;
    and providing accurate predictions on the plurality of deviations of the at least one metric of interest based on the reinforcement learning.

2. The method as claimed in claim 1, wherein the method comprise s receiving the meta data model of the use-case from the client device (116) and modeling the existing deviation management services to determine the specification information of the deviation management service.

3. The method as claimed in claim 1, wherein the deviation management environment (108) progressively learns from available data and updates the plurality of interconnected prediction models of the derivation prediction module (308).

4. The method as claimed in claim 1, wherein method comprise s prioritizing a set of action recommendations to optimize at least one metric of performance of the use-case based on the quantified impact of the at least one deviation.

5. The method as claimed in claim 1, wherein the client device (116) is used to specify at least one rule or an operational constraint associated with the use-case to enable the deviation management environment (108) to generate action recommendation based on a specified rule or the operational constraint.

6. The method as claimed in claim 1, wherein the deviation management environment (108) determines an expected outcome of the action recommendation for the use-case, wherein the expected outcome comprises:
   a quantified gain outcome based on the at least one metric of interest if the use-case takes the action recommendation;
   and a quantified loss outcome based on the at least one metric of interest if the use-case does not take the action recommendation.

7. The method as claimed in claim 1, wherein the plurality of interconnections that are derived among the plurality of deviations of the at least one metric of interest comprises at least one of direct, indirect or cascading relationship.

8. A system of machine learning based deviation prediction and interconnected-metrics derivation for action recommendations, the system comprising:
   a client device (116) that is used to specify a meta data model of a use-case, select at least one metric of interest and capture a use-case action;
   a deviation management environment (108) that provides a deviation management service of the use-case to the client device (116), wherein the deviation management environment (108) further comprises:
   a deviation computation module (302) that obtains a specification information of a deviation management service from a client device (116) and computing a plurality of deviations of at least one metric of interest;
   a deviation factor discovery module (304) that identifies at least one trend and a set of factors which relate to the plurality of deviation of the at least one metric of interest;
   a deviation interconnections derivation module (306) that derives a plurality of interconnections among the plurality of deviations of the at least one metric of interest using interconnected machine learning models;
   a deviation prediction module (308) comprising a plurality of interconnected prediction models, wherein the deviation prediction module (308) determines at least one predicted deviation based on the plurality of deviations and a probability distribution associated with the at least one predicted deviation;
   a predicted deviation classifier and scoring module (310) that receives the at least one predicted deviation determined by the deviation prediction module (308), determines if the at least one predicted deviation qualifies above a predefined threshold, classifies the at least one predicted deviation and assigns a score to the at least one predicted deviation on the basis of a criticality;
   a predicted deviation attribution module (312) that utilizes data available in an external information database (112) and a repository (210) to determine a set of factors which attribute to the at least one predicted deviation, wherein the external information database (112) comprise s weather data, industry data, competitor data, and macro-economic data that enables determination of external factors that attribute to the at least one deviation in the at least one metric of interest;
   a predicted deviation impact computation module (314) that determines a quantified impact of the at least one predicted deviation using interconnected machine learning models;
   a recommendation module (316) that generates action recommendation for the use-case based on the probability distribution of the at least one predicted deviation, a probability distribution of an outcome of at least one action alternatives and the quantified impact, wherein the action recommendation is of either mitigation or leverage for the use-case;
   an action tracking module (318) that tracks an action taken in the use-case from the client device (116) to enable reinforcement learning for providing accurate predictions on the plurality of deviations of the at least one metric of interest.

9. A one or more non-transitory computer-readable storage mediums storing the one or more sequences of instructions, which when executed by the one or more processors, causes to perform method of machine learning based deviation prediction and interconnected-metrics derivation for action recommendations, the method comprising:
   specifying, using a client device (116), a meta data model of a use-case and at least one metric of interest;
   obtaining a specification information of a deviation management service from a client device (116) and computing a plurality of deviations of at least one metric of interest;
   identifying at least one trend and a set of factors which relate to the plurality of deviations of the at least one metric of interest;
   deriving a plurality of interconnections among the plurality of deviations of the at least one metric of interest using interconnected machine learning models;
   determining at least one predicted deviation based on the plurality of deviations and a probability distribution associated with the at least one predicted deviation based on a plurality of interconnected prediction models;
   classifying the at least one predicted deviation if the at least one predicted deviation qualifies above a predefined threshold and assigning a score to the at least one predicted deviation on the basis of a criticality;
   determining a set of factors which attribute to the at least one predicted deviation based on data available in an external information database (112) and a repository (210), wherein the external information database (112) comprises weather data, industry data, competitor data, and macro-economic data that enables determination of external factors that attribute to the at least one deviation in the at least one metric of interest;
   determining a quantified impact of the at least one predicted deviation using interconnected machine learning models;
   generating an action recommendation for the use-case based on the probability distribution of the at least one predicted deviation, the probability distribution of an outcome of at least one action alternative and the quantified impact, wherein the action recommendation is at least one of mitigation or leverage for the use-case;

tracking an action taken in the use-case from the client device (116) to enable reinforcement learning;

and providing accurate predictions on the plurality of deviations of the at least one metric of interest based on the reinforcement learning.

\* \* \* \* \*